United States Patent [19]

Yoshida et al.

[11] 4,429,392
[45] Jan. 31, 1984

[54] LASER OUTPUT CONTROLLING DEVICE

[75] Inventors: Kenichi Yoshida; Kimizo Ono; Katsuyoshi Sunago; Shinya Takenaka; Tohru Iwai, all of Osaka, Japan

[73] Assignee: Sumitomo Electric Industries, Ltd., Osaka, Japan

[21] Appl. No.: 332,776

[22] Filed: Dec. 21, 1981

[51] Int. Cl.³ .............................................. H01S 3/10
[52] U.S. Cl. ......................................... 372/9; 372/29; 372/33; 372/58; 372/81
[58] Field of Search .................. 372/58, 108, 33, 29, 372/25, 81; 137/455, 505, 487.5; 55/418, 417

[56] References Cited

U.S. PATENT DOCUMENTS

| 3,747,634 | 7/1973 | Eufusia | 137/487.5 |
| 3,963,043 | 6/1976 | Cota et al. | 137/487.5 |
| 4,146,051 | 3/1979 | Sparks | 137/487.5 |
| 4,253,480 | 3/1981 | Kessel et al. | 137/487.5 |
| 4,373,697 | 8/1983 | Phelps | 137/487.5 |

Primary Examiner—William L. Sikes
Assistant Examiner—Léon Scott, Jr.
Attorney, Agent, or Firm—Sughrue, Mion, Zinn, Macpeak and Seas

[57] ABSTRACT

Signals for controlling the discharge current and laser gas pressure are provided in predetermined combination in accordance with a selected laser output level.

6 Claims, 5 Drawing Figures

LASER OUTPUT CONTROLLING DEVICE

BACKGROUND OF THE INVENTION

This invention relates to laser output controlling devices, and more particularly to a laser output controlling device which controls a laser output on the parameters of gas pressure and current by a simple operation.

In a laser knife or a laser machining device, the laser output must be controlled. In the laser output control, for instance in the case of a $CO_2$ laser, a discharge current value must be controlled, and the gas pressure in a laser oscillating tube should also be controlled since the $CO_2$ laser output varies with discharge current and gas pressure. More specifically, when the discharge current is 10 mA, the $CO_2$ laser output is about 8.5 W with a gas pressure 15 Torr, about 13 W with a gas pressure 20 Torr, about 17 W with a gas pressure 25 Torr, and about 20 W with a gas pressure 30 Torr, as indicated in FIG. 1. When the gas pressure is set to 20 Torr, the laser output is about 21.5 W with a current 20 mA, and is about 25.5 W with a current 30 mA.

Heretofore, the gas pressure and the current value have been adjusted individually. That is, the gas pressure has been controlled by adjusting the control value of the gas pipe, while the current value has been controlled with a control knob.

In such a conventional device, the gas pressure and the current value are controlled manually, and simultaneous control of the two parameters is considerably difficult. If a person unskilled in the control of the device attempts to control the parameters, he may cause serious trouble. For instance, when it is desired to obtain a laser output 25 W in FIG. 1, the current value can be set to 13 mA with a gas pressure 30 Torr, but the laser output is greatly changed with a slight change in current. Further, when it is desired to obtain a laser output 30 W, the gas pressure can be set at 22 Torr with a current 30 mA, but the laser output will changed greatly with a slight change in gas pressure.

The controls for these two parameters cannot be easily controlled by a person who may have a laser attachment in hand, and therefore a doctor performing an operation with a laser knife cannot freely control the gas pressure and the current value. Thus, the conventional device is unsatisfactory from both safety and reliability viewpoints.

There is a device known in the art in which the gas pressure is fixed so that only the current value is controlled. However, since the characteristic curve has a considerably steep part and the output peak is limited, as shown in FIG. 1, it is difficult to provide a laser output which is stable over a wide range.

SUMMARY OF THE INVENTION

In view of the above-described difficulties, an object of this invention is to provide a laser output controlling device in which the gas pressure and the current value are not individually controlled to control the laser output; that is, the troublesome or difficult control and the control error are eliminated, and which is high in security and reliability and provides a stable laser output.

The foregoing object of the invention is achieved by the provision of a laser output controlling device in which, according to this invention, a laser gas is supplied from a cylinder through a flow rate adjusting section to a laser oscillating device, electric power is supplied from a power source through a current controlling section to the laser oscillating device, control signals which are applied from signal sources to the flow rate adjusting section and the current controlling section respectively are combined according to a desired laser output, and the combination of the control signals are selected by an output control switch assembly.

DETAILED DESCRIPTION OF THE INVENTION

Figure 2:
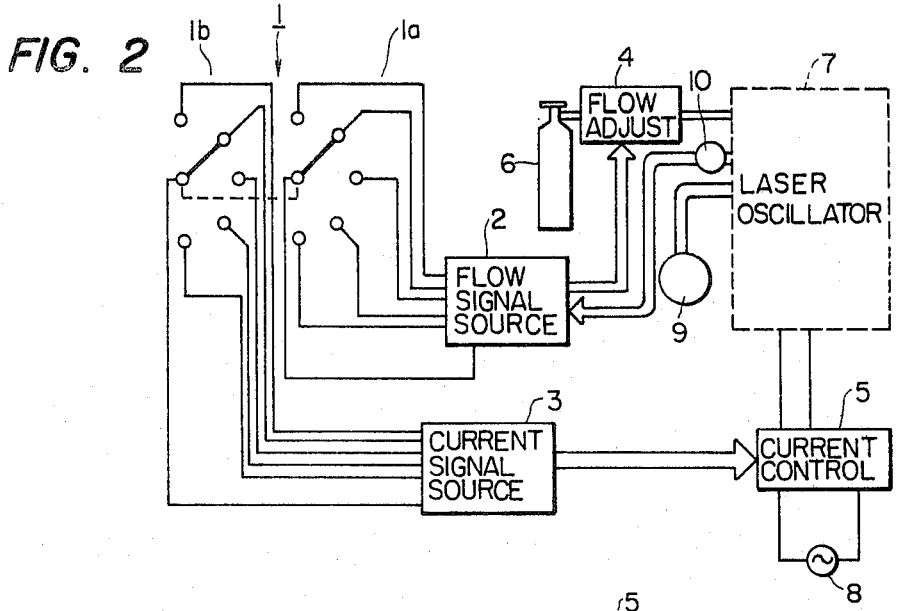
FIG. 2 is a schematic circuit diagram showing one example of a laser output controlling device according to this invention.
Figure 3:
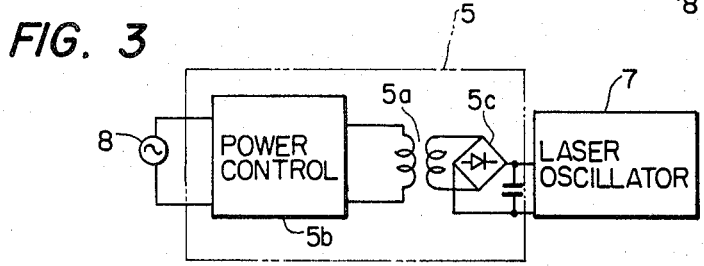
FIGS. 3 and 4 are circuit diagrams showing two examples of a current controlling section in the laser output controlling device.

Embodiments of the invention will be described with reference to FIGS. 2 through 5. In FIG. 2, reference numeral 1 designates an output control switch assembly indicating laser outputs. The switch assembly 1 consists of two switches 1a and 1b which are operated simultaneously by one operating knob to set a laser output. The switch 1a of the switch assembly 1 is connected to a signal source 2 in a flow rate adjusting section, and the switch 1b is connected to a signal source 3 in a current controlling section. These signal sources 2 and 3 supply control signals to the flow rate adjusting section 4 and the current controlling section 5, respectively.

Figure 1:
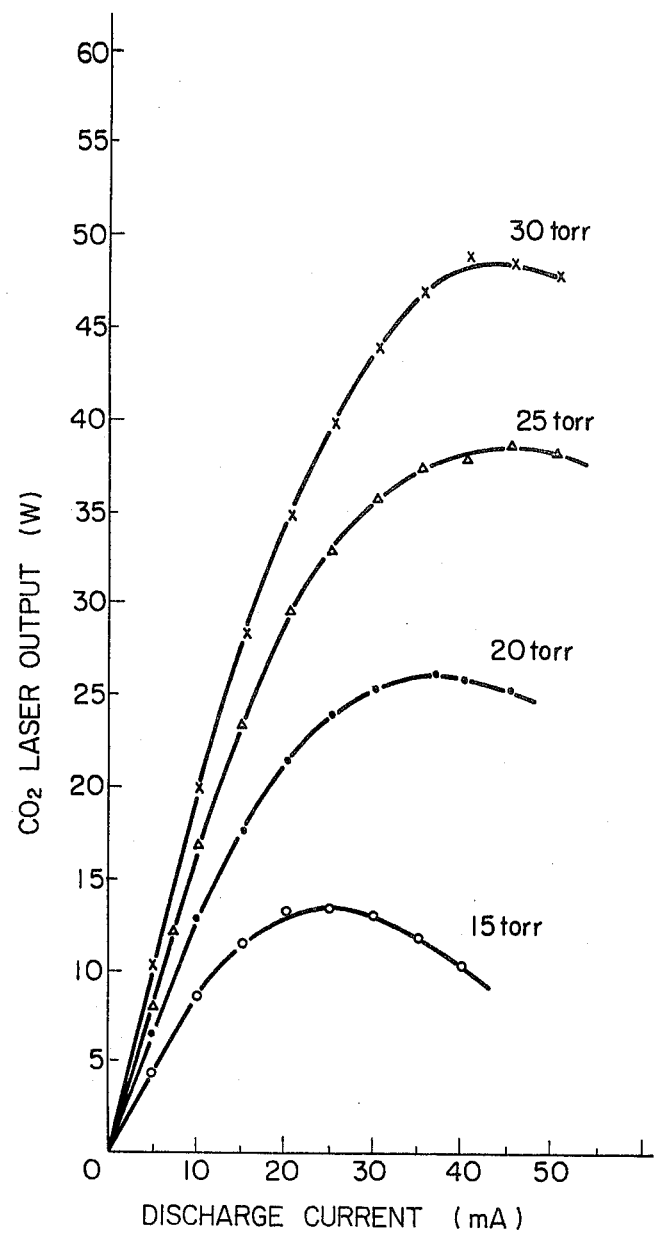
FIG. 1 is a characteristic curve diagram showing $CO_2$ laser output with discharge current.

The control signals provided by the signal sources 2 and 3 are combined according to a selected laser output. The control signals are selectively combined in such a manner that, for instance when it is desired to obtain a laser output of 10 W, a current vs. power characteristic of a gas pressure 15 Torr in FIG. 1 is utilized, and when it is required to obtain laser outputs 30 to 35 W, a characteristic of a gas pressure 25 Torr is utilized. Thus, for instance, when a laser output of 10 W is selected, the control signals are so set that a gas pressure of 15 Torr and a current of 12 mA are provided, and when a laser output of 30 W is selected, the control signals are so set that a gas pressure of 25 Torr and a current of 20 mA are provided. In order to minimize the output variation, such combination are determined in the signal sources 2 and 3 in advance so that the top parts of the characteristic curves in FIG. 1 are used where the slopes are not as steep.

The control signal from the signal source 2 controls the flow rate adjusting section 4. The flow rate adjusting section 4 may employ a mass flow controller which is commercially available or may employ a system of driving a manual flow rate control valve with a motor. The flow rate adjusting section 4 is connected between a cylinder 6 filled with gas and a laser oscillating device 7.

Figure 4:
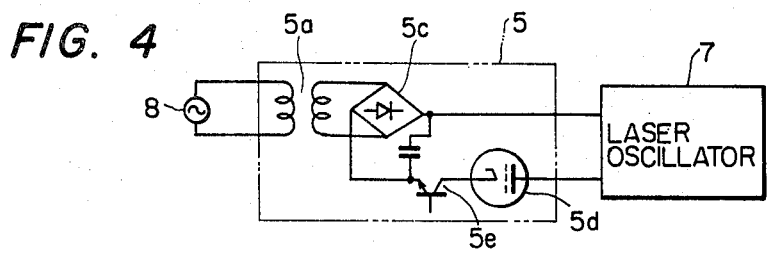

The control signal from the signal source 3 is supplied to the current controlling section 5. In the current controlling section 5, as shown in a circuit surrounded by the broken line in FIG. 3, the primary side of a high voltage transformer 5a is controlled by a power control element 5b such as a thyristor, a thyratron or a saturable reactor, and a DC discharging rectifier 5c is arranged on the secondary side of the high voltage transformer, or the primary side of the high voltage transformer can be controlled by a motor driven "slidac" in a well known manner. Alternatively, in the current controlling section 5, as shown in FIG. 4, a high voltage withstanding transmitting tube 5d can be connected in series with a laser oscillating tube on the secondary side of the high voltage transformer 5a and a power transistor 5e can be arranged, so as to obtain a constant current. The current controlling section 5 is connected between a power source 8 and the laser oscillating device 7, to control the discharge current of the laser oscillating tube.

A vacuum pump 9 for pumping the gas is connected to the laser oscillating device 7, i.e., to the laser oscillating tube. By making the gas pumping speed of the vacuum pump 9 constant, the flow rate adjusting section 4 is able to perform pressure adjustment.

In FIG. 2, reference numeral 10 designates a pressure gauge. Since the pressure can be converted into an electrical signal by the pressure gauge 10, pressure control can be carried out with higher reliability by feeding back the electrical pressure signal to the flow rate control signal source 2.

Figure 5:
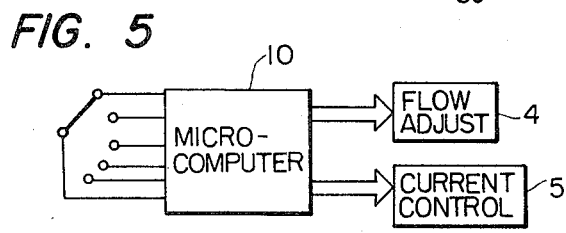
FIG. 5 is a block diagram showing another example of the laser output controlling device which utilizes a microcomputer.

As shown in FIG. 5, instead of the signal sources 2 and 3, a microcomputer 10 may be provided, and the output control switch assembly 1 can be connected to the input of the microcomputer 10. It goes without saying that, in this case, the microcomputer 10 will function to select from memory one of the combinations of two parameter control signals according to a selected laser output.

Instead of the output control switch assembly 1, variable resistors may be employed. In such a case, the control signals could be continuously variable and could be set and combined according to the continuous variations of the variable resistors.

As is apparent from the above description, according to this invention, the two control parameters are controlled by a single operation, to control the laser output. Therefore, the laser output can be controlled easily and correctly. When a doctor utilizes the laser output, he can control the laser output as desired with a high degree of safety, and the laser output is stable at all times.

What is claimed is:

1. In a gas laser of the type including pressure control means for controlling a laser gas pressure in response to a pressure control signal and current control means for controlling a laser discharge current in response to a current control signal, the improvement comprising:
   selection means for selecting a plurality of desired laser output levels including
   output control means for simultaneously varying both said pressure control and current control signals in accordance with operation of said selection means.

2. The improvement as claimed in claim 1, wherein said output control means comprises:
   pressure signal generating means for generating said pressure control signal in response to a first input;
   current signal generating means for generating said current control signal in response to a second input; and
   wherein said selection means comprises means for simultaneously changing said first and second inputs in response to operation of said selection means.

3. The improvement as claimed in claim 2, wherein said means for simultaneously changing said first and second inputs comprises first and second switches ganged together for simultaneous operation upon operation of said selection means, said first and second switches providing said first and second inputs, respectively.

4. The improvement as claimed in claim 2, wherein said output means includes memory means for providing a predetermined combination of first and second inputs in accordance with the output level selected by said selection means.

5. The improvement as claimed in claim 1, wherein said output control means includes a microcomputer for providing a predetermined combination of pressure and current control signals to said pressure and current control means, respectively, in response to the output level selected by said selection means.

6. The improvement as claimed in claims 1, 3 or 5, wherein said pressure control means comprises means for controlling the rate of flow of a gas to said gas laser and said pressure control signal is a flow rate control signal.

* * * * *